(12) United States Patent
Suzuki

(10) Patent No.: US 6,960,408 B1
(45) Date of Patent: Nov. 1, 2005

(54) METHOD OF PRODUCING LEAD STORAGE BATTERIES AND JIG FOR PRODUCTION THEREOF

(75) Inventor: Toshikazu Suzuki, Fukushima (JP)

(73) Assignee: The Furukawa Battery Co., Ltd., Yokohama (JP)

( * ) Notice: Subject to any disclaimer, the term of this patent is extended or adjusted under 35 U.S.C. 154(b) by 374 days.

(21) Appl. No.: 09/857,187

(22) PCT Filed: Oct. 26, 2000

(86) PCT No.: PCT/JP00/07495

§ 371 (c)(1),
(2), (4) Date: Jun. 20, 2001

(87) PCT Pub. No.: WO01/31719

PCT Pub. Date: May 3, 2001

(30) Foreign Application Priority Data

Oct. 28, 1999 (JP) .................................. 11-306405
Aug. 1, 2000 (JP) ............................. 2000-232727

(51) Int. Cl.$^7$ ........................... H01M 2/28; H01M 2/30
(52) U.S. Cl. ..................... 429/180; 429/178; 29/246; 29/730
(58) Field of Search .............................. 29/623.4, 246, 29/730; 429/163, 178, 182, 180

(56) References Cited

U.S. PATENT DOCUMENTS 6,270,922 B1 * 8/2001 Ohmura et al. ............. 429/176

FOREIGN PATENT DOCUMENTS

| JP | 51-073234 | | 6/1976 | | |
|---|---|---|---|---|---|
| JP | 52-110439 | | 9/1977 | | |
| JP | 52-111634 | | 9/1977 | | |
| JP | 357103265 | * | 6/1982 | ........... | H01M 4/68 |
| JP | 359171461 | * | 9/1984 | ........... | H01M 2/30 |
| JP | 60-027486 | | 2/1985 | | |
| JP | 362268055 | * | 11/1987 | ........... | H01M 2/30 |
| JP | 02-020275 | | 2/1990 | | |
| JP | 03-263756 | | 11/1991 | | |
| JP | 05-006769 | | 1/1993 | | |
| JP | 05-082118 | | 4/1993 | | |
| JP | 05-325940 | | 12/1993 | | |
| JP | 408293299 | * | 11/1996 | ........... | H01M 2/22 |
| US | 5336273 | * | 8/1994 | ................ | 29/623.2 |
| US | 5397660 | * | 3/1995 | ................. | 429/163 |

OTHER PUBLICATIONS

Kouda, Yoshiaki, et al., *Yousetsuhou no Kiso*, 1$^{st}$ Edition, 6$^{th}$ Printing, Jun. 1, 1996, Sanpo Shuppan K.K., (pp. 63, 72-77) (Japanese).

* cited by examiner

*Primary Examiner*—Mark Ruthkosky
(74) *Attorney, Agent, or Firm*—Armstrong, Kratz, Quintos, Hanson & Brooks, LLP

(57) ABSTRACT

A process for producing a lead-acid battery, in which a lead bushing cast in a lid b of an assembled lead-acid battery A and a pole inserted through an insertion hole in the lead bushing are welded together by applying a laser beam thereto. At the time of the laser welding, as desired, a jig is so placed around the lead bushing as to surround it and the laser welding is carried out.

20 Claims, 10 Drawing Sheets

METHOD OF PRODUCING LEAD STORAGE BATTERIES AND JIG FOR PRODUCTION THEREOF

BACKGROUND OF THE INVENTION

1. Field of the Invention

The present invention relates to a process for producing a lead-acid battery and more particularly, a process for producing a lead-acid battery related to welding of terminal portions of the battery, and a jig for producing the same.

2. Description of the Related Art

It is a conventional practice either to produce a lead-acid battery of a so-called bushing terminal type in which a lead bushing also serves as a terminal, by inserting an upper portion of a pole protruding upwards from a cell chamber within a battery container of an assembled lead-acid battery through an insertion hole in a lead bushing cast in a lid made of a synthetic resin by a cast molding process, and welding the pole inserted and the lead bushing around an outer periphery of the pole to each other, or to produce a lead-acid battery of a type having a terminal member led out sideways by mounting a separately fabricated terminal on an outer peripheral surface of a lead bushing, and welding the bushing and the terminal to each other using a burner.

In this case, at the time of welding using the burner, as mentioned above, in order to previously prevent deformation of the lid as a result of welding heat, whereby an air-tightness failure would occur between the lid and the lead bushing integrally cast in the lid, it has preferably been practiced in general to carry out the burner welding in such a state that an annular mold of a jacket type for passing cooling water therethrough is disposed in contact with the peripheral surface of the lead bushing or the peripheral surface of the terminal mounted on the bushing.

More particularly, in the case of producing the lead-acid battery of a bushing terminal type as described above, it has been conventional practice to weld terminal portions to be welded of the lead-acid battery, i.e., mutually abutted or adjacent peripheral portions of the lead bushing integrally cast in a lid made of a synthetic resin by an insertion molding and a pole of a battery body inserted through a cylindrical hole in the lead bushing to each other by a burner flame.

In the case of welding of the pole and the lead bushing using the burner, however, if the height from the surface of the lid to an upper end surface of the lead bushing is not more than 8~10 mm, in other words, is less than 8~10 mm, deformation of the lid is unavoidable as a result of the heat generated during the burner-welding, even if the above-mentioned cooling means is used, an air-tightness failure occurs between the lid and the lead bushing formed in the lid. Therefore, it is required that the upper end of the lead bushing protrudes more than 8~10 mm from the surface of the lid, and hence, such a corresponding height-wise space enough to accommodate the lead bushing terminal is required above the upper surface of the lid. On the other hand, it is desirable to produce a lead-acid battery of the type leading out the terminal sideways which is capable of lowering a height-wise space above the upper surface of the lid. However, in the burner-welding of a base portion of the lead bushing and a plate-shaped terminal having a thickness of several mm, fitted thereon the distance between the portion of the terminal to be welded and the surface of the lid is only several mm, so that an air-tightness failure is often generated between the lid and the lead bushing cast in the lid due to the thermal deformation of the lid caused by the burner-welding, to result in many manufacture losses.

Therefore, it is desired to remove such inconveniences and develop a process for producing a lead-acid battery, wherein welding of the required portions can be achieved smoothly without any manufacture loss.

When welding of the foregoing terminal portions is carried out using a burner flame, the lid made of a synthetic resin around the terminal portion is softened by heat of the burner flame to create a gap between the lid and the bushing, thereby bringing about an air-tightness failure. In addition, it is difficult to make a depth of penetration of the welded portions uniform and further, the appearance shape of the welded terminal portion is collapsed and hence, it is difficult to make a welded terminal of a definite shape.

Accordingly, it is desired to remove such inconveniences and develop a process for producing a lead-acid battery by such a process for welding of the terminal portions that is capable of welding the terminal portions to each other stably and satisfactorily without any manufacture loss.

SUMMARY OF THE INVENTION

It is an object of the present invention to provide a process for producing a lead-acid battery which has removed the problems associated with the prior art, and the present invention includes a lead bushing integrally cast in a lid of an assembled lead-acid battery and a pole inserted through the lead bushing are welded together by a laser welding.

Further, a process for producing a lead-acid battery according to the present invention, includes welding of a lead bushing integrally cast in a lid of an assembled lead-acid battery and a pole inserted through the lead bushing and welding of the lead bushing and a tab terminal member fitly mounted on in the lead bushing are carried by a laser welding.

Further, in the process for producing the lead-acid battery according to the present invention, at the time of the laser welding a laser beam of a low output is applied and, thereafter, a laser beam of a high output is applied.

Further, in the process for producing the lead-acid battery according to the present invention, the laser welding is of a pulsed type.

Further, in the process for producing the lead-acid battery according to the present invention, the lap density of beads in the laser welding of the pulsed type is in a range of 6~12 points per mm.

Further, it is an object of the present invention to provide a process for the laser welding of the terminal portions of the lead acid battery for preventing a laser beam from intercepting by fumes generated at the time of application thereof in the laser welding in the process for producing the above-mentioned lead-acid battery, to make it possible to carry out the welding at a high efficiency and stably and sufficiently, such that when the laser-welding is carried out by applying the laser to terminal portions to be welded of the lead-acid battery, a process for laser-welding of the terminal portions is used such that the terminal portions are surrounded by a lower cylindrical end portion of a cylindrical shield, and, in this state, fumes generated at the time of the laser-welding are sucked to be exhausted to the outside of the cylindrical shield through an exhaust port in the cylindrical shield.

Further, it is an object of the present invention to provide a process for the laser welding of the terminal portions which is capable of carrying out the welding by application of the laser beam accurately and at a good efficiency when the above-mentioned process for laser welding is used in the above-mentioned process for producing the lead-acid battery, and a discharge opening is provided in the cylindrical shield, and oxygen or air is supplied through the discharge opening to the portions to be welded.

Further, it is an object of the present invention to provide a process for laser welding for carrying out the laser welding more accurately and at a better efficiency when the above-mentioned process for laser welding is used in the above-mentioned process for producing the lead-acid battery, and a shroud ring having the plural of communication openings made circumferentially in its peripheral wall is installed in the cylindrical shield with an annular space left between the shroud ring and the inner peripheral wall surface of the cylindrical shield so that fumes generated in the shroud ring may be sucked to be exhausted out of the cylindrical shield through the communication holes of the shroud ring, the annular space surrounding thereof and the exhaust port, together with a shielding fluid flowed through the discharge opening into the cylindrical shield.

Further, the present invention, which is capable of carrying out the laser welding at a better efficiency while removing the fumes at a good efficiency by the laser welding when the above-mentioned laser welding is used in the above-mentioned process for producing the lead-acid battery, and the plural communication bores made at regular intervals in the shroud ring are formed into those which are open in a circumferentially tangent direction of the ring, whereby an eddy flow is occurred to the fumes generated inside the shroud ring and is sucked to be exhausted.

Further, it is an object of the present invention to provide a laser welding jig which is suitable for carrying out the above-mentioned process for producing the lead-acid battery, and it is characterized in that an opening of the upper surface of a cylindrical body made of a metal having a good heat conductivity is closed by a light-transmission plate and a lower cylindrical portion thereof is adapted to be fitted on the outer peripheral surface of the terminal portions of a lead-acid battery, so that a cylindrical shield is formed, and the cylindrical shield is provided with the plural discharge openings for a shield fluid disposed circumferentially at the lower portion thereof, and a shroud ring provided with the plural communication openings disposed at regular intervals circumferentially at a position which is above the discharge openings is so installed in the cylindrical shield as to leave an annular space between the shroud ring and the inner surface of a peripheral wall of the cylindrical shield, and the cylindrical shield is provided with an exhaust port which communicates with the annular space.

The disclosure of other characteristics of a process for producing a lead-acid battery and a welding jig used for the same according to the invention will be made clear in detail hereinafter.

BEST MODE FOR CARRYING OUT THE INVENTION

The present invention will now be described in detail for more clarification, with reference to the accompanying drawings.

Figure 1:
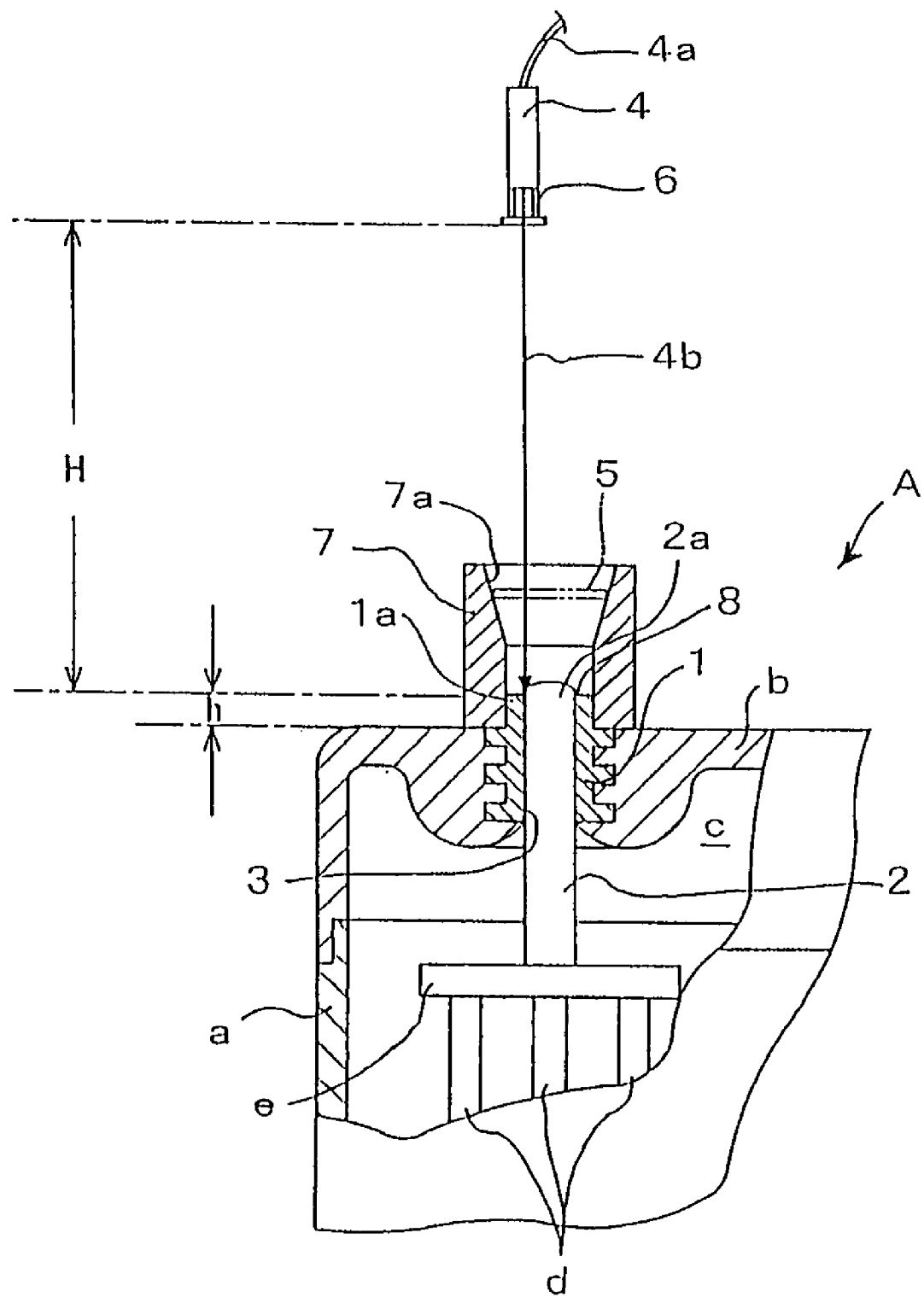
FIG. 1 is a partially cutaway side view of one example of an embodiment of a process for producing a lead-acid battery according to the present invention.
Figure 2:
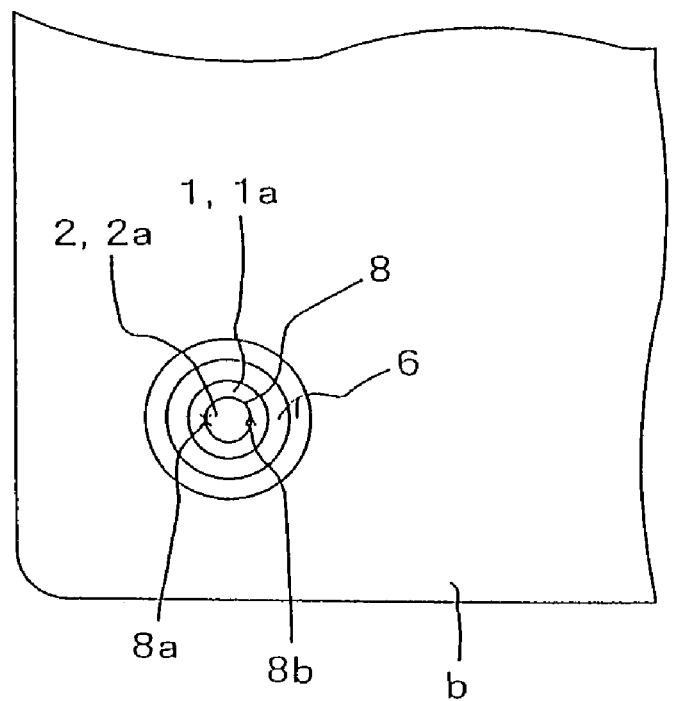
FIG. 2 is a top view of a terminal portion of the lead-acid battery shown in FIG. 1.

FIGS. 1 and 2 show one embodiment of the present invention suited for to a process for producing a lead-acid battery of a type having a lead bushing terminal. FIG. 1 is a partially cutaway side view of an assembled lead-acid battery A in such a state that a laser nozzle connected to a laser-generating device (not shown) is disposed above the upper surface of terminal portions of a pole to be welded of the assembled lead-acid battery A, and FIG. 2 is a top view of a lid thereof.

More specifically, the assembled lead-acid battery A comprises a mono-block type lead-acid battery, for example, comprising six cells. In the drawings, reference character a designates a molded battery container made of a synthetic resin such as polypropylene, and reference character b designates a molded lid for the battery container which is abutted against and air-tightly bonded to the upper surface of the container a, which has an upper flat surface and which is provided with a lead bushing 1 integrally cast thereinto by a casting process using a synthetic resin such as polypropylene as a raw material. The lead bushing 1 is preferably made using, preferably, lead alloys such as Pb—Ca—Sn, etc. as a material. According to the present invention, the lead bushing 1 is so cast that a projected height h from the upper surface of the lid b to the upper end surface thereof as to be such a very low height that is 15 mm or less, preferably, 10 mm or less, e.g., 4 mm in the illustrated embodiment.

Cells contained in respective cell chambers c in the container a are connected in series, as usual, and the lead-acid battery is assembled in such a manner that an upper portion 2a of a positive pole 2 protruding upwards from a strap e connecting, for example, ears of the positive plates d,d, . . . among positive and negative plates constituting the cell in the cell chamber c at one end of the container a is inserted through an insertion hole 3 of the lead bushing 1 located at a corner portion of one side of the container lid b, as shown in the drawings, and an upper portion of a negative pole protruding upwards from a strap connecting negative plates of the cell in the cell chamber at the other end of the container a is inserted through an insertion hole in a lead bushing likewise cast therein, though not shown. According to the present invention, the upper portion 2a of the positive pole 2 of the lead-acid battery thus assembled and the projection portion 1a of the lead bushing 1 around the outer peripheral surface thereof are welded together by a laser welding, and the upper portion of the negative pole and the projection of the lead bushing around an outer periphery thereof are welded together similarly by a laser welding. For convenience, only the laser welding of the pole 2 which is the positive pole and the lead bushing 1 on one side as shown in FIG. 1 will be described below in detail. The description the laser welding on the negative pole side is omitted, because it is carried out in the same manner.

According to the present invention, a laser-welding nozzle 4 is placed at a desired height distance spaced apart from the upper end of the lead bushing 1 above the positive pole 2 and the lead bushing 1 around the outer periphery thereof, and a plate-shaped transparent shield glass 5 is placed below the welding nozzle 4. The shield glass 5 is disposed just below the nozzle 4 through a support leg 6 depending vertically therefrom, or is placed on the upper surface of a cylindrical mold 7 which is placed on the upper surface of the lid b, and also is fitly mounted on the outer peripheral surface of the projection 1a of the lead bushing 1 to support the lead bushing 1, as shown by phantom lines. The mold 7 shown in the drawings, in other words, a jig is a cylindrical mold made of copper having a good thermal conductivity which also serves acts to cool the lead bushing 1 heated during the welding, and the inner peripheral surface of the upper portion thereof is formed into a trumpet-shaped slant surface 7a spread upwards, so that the shield glass 5 is placed stably on the inner peripheral slant surface 7a. It is not necessary for mold 7 made of copper to provide an equipment of a jacket type through which cooling water is passed as conventional, and to carry out a cooling operation while passing water therethough. The shield glass 5 is for protecting the laser nozzle 4 from deposition of sputtered lead produced when a laser beam 4b from the laser nozzle 5 is applied to the upper surfaces of the pole 2 and the lead bushing 1 as shown in FIG. 1 for welding them to each other. The height distance from the upper end surface of the lead bushing 1 to the lead shield glass 5 is generally kept about 15 mm ~100 mm.

The nozzle 4 is connected to a predetermined laser-generating source through an optical fiber 4b. A type of a laser is for example, a YAG laser by which the laser welding according to the present invention is carried out. A method of the laser welding may be either a continuous welding one or a pulsed welding one, but, in a case where the depth of weld (penetration) of lead or a lead alloy is required to be made deep, the pulsed welding method is preferable. The laser welding according to the present invention is carried out by applying a laser beam of an high output, for example, 6~8 Joules enough to weld the lead or lead alloy, to and along the mutually abutted or adjacent circular portions 8 of the outer peripheral surface of the pole 2 and the outer peripheral surface of the lead bushing 1 or their vicinities, and moving it at least one round while welding the portions 8 together, so that welding between the pole 2 and lead bushing 1 is welded together to form a laser-welded terminal portion. It is sufficient if the depth of weld or penetration of the laser-welded portion is at least about 2.5 mm. The present inventors have found that, according to this laser-welding, even if the height of the lead bushing 1 from the upper surface of the lid b is only 4 mm, a stable and good welding the pole 2 and the bushing 1 together can be achieved without occurrence in the thermal deformation of the lid b. Accordingly, in respect of the lead-acid battery thus produced according to the present invention, the lead bushing terminal protruding from the upper surface of the lid b is as only low as 4 mm, so that there is brought about such an effect that the height space above the terminal can be lowered remarkably, as compared with 8~10 mm or more conventionally required.

In addition, the pole 2 and the bushing 1 are made of lead or a lead alloy, and it is general and preferable that both members are made using the same material.

In a case where the pole 2 and the bushing 1 are made of a lead alloy, any of various kinds of a lead alloy such as a Pb—Sb alloy, a Pb—Ca—Sn alloy, a Pb—An alloy, a Pb—Sb alloy and the like can be used and is suitably used for the laser welding, but it has been found that the surface of a Pb—Ca based alloy which is liable to be oxidized in particular is coated with a black oxide film by the air, so that it is increased in absorptivity of the laser beam and is suited for carrying out a relatively deep weld by the laser-welding.

When the laser welding according to the present invention is carried out, the following phenomenon has been found.

Namely, when a laser beam of a high output is applied from the beginning to the surface of the lead busing 1 and that of the pole 2, it has been observed that the lead or lead alloy on the surfaces thereof is sputtered vigorously and explosively to become so-called sputtered lead and adhere to the surface of the shield glass 5 positioned thereabove, and thereby the laser beam is intercepted. Therefore, the laser welding is carried out sufficiently at the start of the laser welding, but the laser welding power is reduced with the lapse of time and thus, there is a fear that the mutually abutted annular portions 8 cannot be welded to each other sufficiently by the laser welding. As a result of various experiments, it has been proved that if in the first place, a laser beam 5b is applied at such a low output that produces no sputtering and is moved one round along the entire circumferential surfaces of the pole and the lead bushing, and thereafter it is applied at a high output, a satisfactory laser-welding is achieved at a high efficiency and with a high energy over the entire circumferential surfaces thereof.

A comparison test example will be described in detail below.

At the time of welding the whole circumferences of the mutually abutted annular portions 8 of the pole 2 and the lead bushing 1 to be welded by the pulsed laser-welding, respective welded portions obtained by such a laser-welding case (an example of the present invention) that a laser beam of a low output as low as 0.8~1.5 Joules/pulse was firstly applied to the fire entirely circumferential surfaces of mutually abutted portions 8 and the vicinities thereof to break the lead oxide film, and a laser beam of a high output as high as 6~8 Joules/pulse was then applied to the entire circumferences thereof, thereby achieving the laser welding, and by such a laser-welding case (a comparative example) that a laser beam of a high output as high as 6~8 Joules/pulse was carried out from the beginning, were cut, respectively, by a line connecting between a starting point of the welding 8a indicated by a mark X on the mutually abutted annular portions 8 in FIG. 2 and a mid point 8b of the welding which is on the opposite side of the welding-starting point 8a and indicated by a mark Δ, and a depth of weld (penetration) of each of the respective welded portions of the cut surfaces thereof was measured, and there were obtained the results shown in Table 1 below.

TABLE 1

| | Depth (mm) of weld (penetration) | |
|---|---|---|
| | Starting point of the welding | Mid point of the welding |
| Example | 2.4~2.6 | 2.4~2.6 |
| Comparative Example | 2.4~2.6 | 1.5~2.0 |

As is clear from Table 1 above, when the laser beam of the low output was first applied and the laser beam of the high output is then applied, according to the present invention, there was obtained a good weld in which the depths of welds at both of the starting point of the welding and the mid point of the welding were the same about 2.5 mm which is a satisfactory weld. In contrast therewith when the welding is carried out using the laser beam of the high output from the beginning, there is obtained a good weld in which the depth of weld at the start point of the welding is about 2.5 mm which is a satisfactory weld, but the depth of weld at the mid-point of the welding in the course of the welding was as shallow as 1.5~2.0 mm which is found to be insufficient in the depth of weld. This difference between the superiority and the inferiority is particularly remarkable in a case of using any of Pb—Ca based alloys that an oxide film is produced on the surface thereof.

Figure 3:
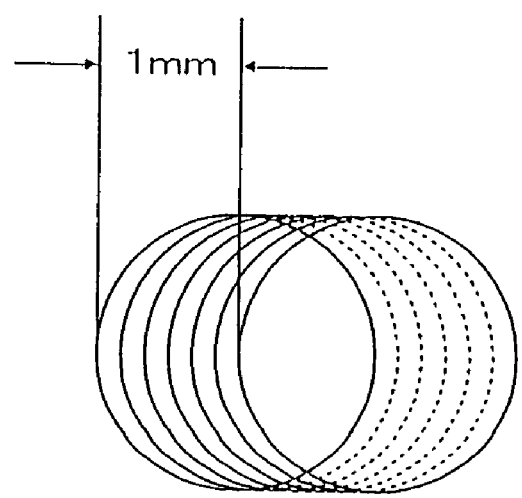
FIG. 3 is a diagram for explaining a lap density of welding beads.

Further, it has been proved that when the pulsed laser welding was carried out by applying a laser beam of a high output to and along the mutually abutted portions 8, the number of the beads of the welding overlapped per 1 mm, i.e., a lap density of the beads, as shown in FIG. 3, has various influences on the weld state, as described hereinafter.

Namely, 100 assembled lead-acid batteries as shown in FIG. 1 were used as samples, and the welding was carried out in such a manner that a laser beam of a low output as low as 0.8 Joules/pulse was applied to the surfaces of the leas bushing 1 and the pole 2 of each of the 100 assembled lead-acid batteries, and thereafter a pulsed laser beam of a high output as high as 6~8 Joules/pulse was applied to the mutually abutted portions 8 by changing the lap density of the beads (having a diameter of 2 mm) variously. A depth of weld (penetration), a rate of generation of pinholes and a rate of generation of lack of air-tightness caused by the deformation of the lid were examined for each of the samples. Results are as shown in Table 2 below.

TABLE 2

| Lap number of beads piled per mm (points) | Depth of weld (penetration) (mm) | Rate of generation of pinholes (%) | Rate of generation of lack of air-tightness (%) |
|---|---|---|---|
| 0 | 0.8 | 48 | 0 |
| 3 | 1.4 | 20 | 0 |
| 6 | 2.5 | 0 | 0 |
| 9 | 3.0 | 0 | 0 |
| 12 | 3.3 | 0 | 0 |
| 15 | 3.9 | 0 | 27 |

In Table 2 above, the depth of weld (penetration) shows an average value of 100 samples in each of 6 kinds having different lap densities of the beads. As is clear from Table 2, in the case where the lap number of beads per mm was 0, i.e., any bead was not overlapped within 1 mm, the depth of penetration was 0.8 mm, and in the case where the lap number of beads per mm was 3 points, the depth of penetration was 1.4 mm, and thus not only the depth of penetration was shallow and the laser welding was insufficient, but also the rate of generation of pinholes, passing through the penetration portion, that is, the weld portion, the former case was 20% and the latter was 48%.

On the other hand, in the case where the lap number of beads per mm was 6 points ~12 points, the depth of penetration was so deep as 2.5~3.3 mm, and also no pinhole passing through the penetration portion was generated to obtain stable and good laser-welds. In the case where the lap number of beads per mm was 15 points, it has been found that the depth of penetration became 3.9 mm, which was too deep, and the lid b was thermally deformed, and the air-tightness with the lead bushing cast in the lid b was broken to generate the lack of air-tightness.

Consequently, it has been found that in the case where the lap number of beads/mm within the length of 1 mm is in a range of 6 points ~12 points, stable and good laser welding can be carried out.

Figure 4:
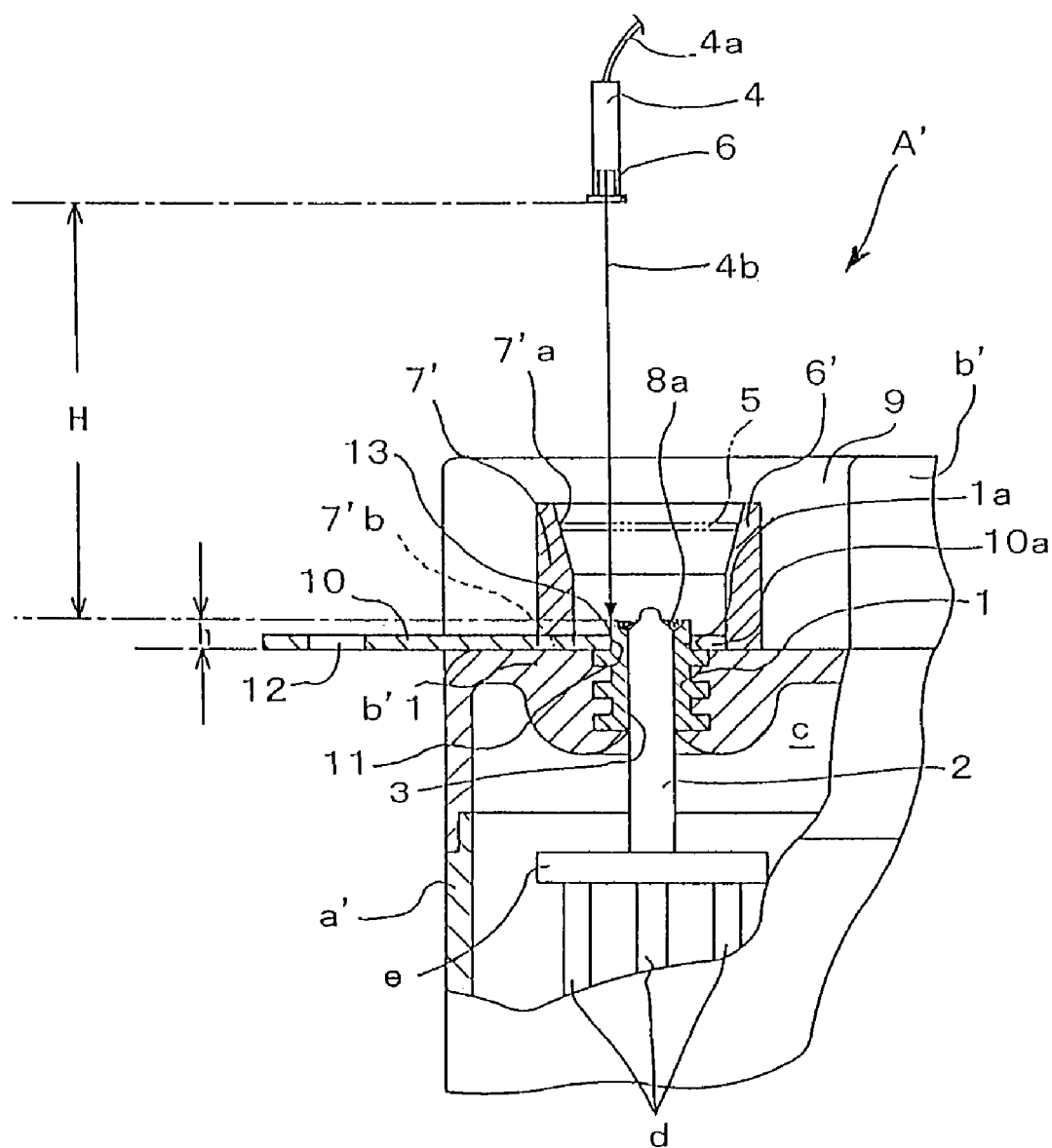
FIG. 4 is a partially cutaway side view of another embodiment of a process for producing a lead-acid battery according to the present invention.
Figure 5:
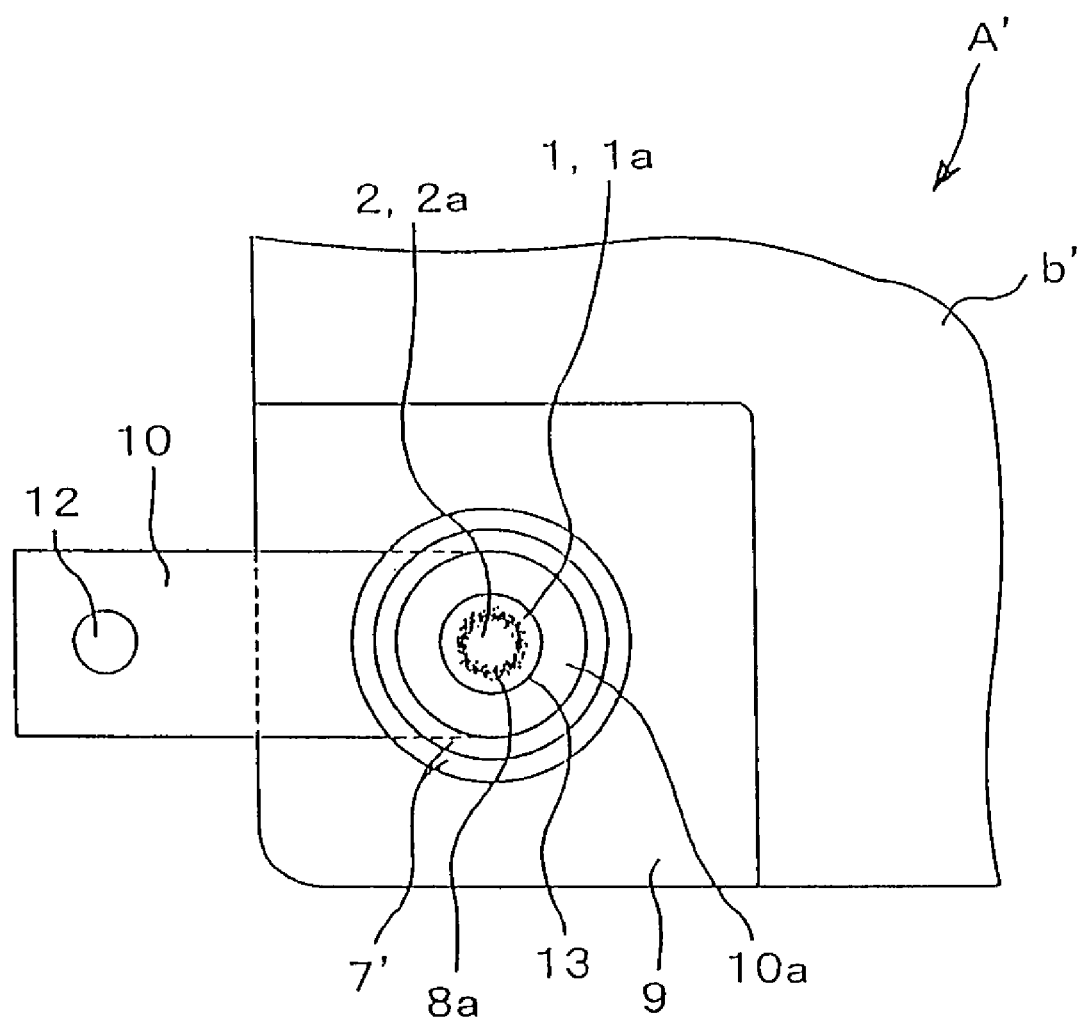
FIG. 5 is a top view of a terminal portion of the lead-acid battery shown in FIG. 4.
Figure 6:
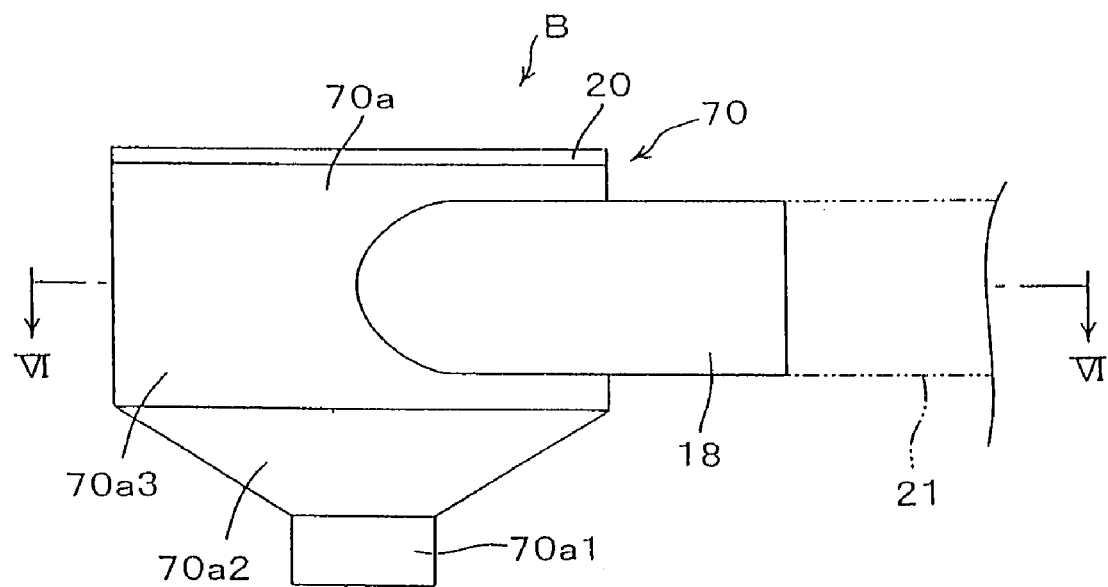
FIG. 6 is a side view of a laser-welding jig according to one embodiment of the present invention for use in the process for producing the lead-acid battery according to the present invention.

FIGS. 4 and 5 show an embodiment of the present invention applied to a lead-acid battery of a type provided with a tab terminal member is prepared separately and welded to the lead bushing to be led out sideways. FIG. 4 is a side view thereof with the same part portion cut away as that in FIG. 1, and FIG. 5 is a top view of a lid.

In this embodiment, a structure of the assembled lead-acid battery A' is such that there is formed a notched space 9' in lib b' at the corners of one end and the other end thereof, and a lead bushing 1 is cast in a lid portion b'1 formed at a lower level at bottom surface of the notched space 9. In this case, the height of a projection portion 1*a* of the lead bushing 1 from the upper surface of the lid b'1, i.e., the height h of the projection portion 1*a* to the upper end surface of the lead bushing 1 is set at 4 mm which is the same, as in the previous embodiment, and the upper portion 2*a* of a pole 2 protruding upwards from a negative strap e of a cell in a cell chamber c at one end of a battery container a' is inserted through an insertion hole 3 of the lead bushing 1. Further, a tab terminal member 10 comprising a prolong plate having the thickness of about 3~4 mm most preferably, a tab terminal member 10 comprising a prolong plate made of lead or a lead alloy, is fitly mounted on the outer peripheral surface of the columnar lead bushing 1 through a circular fitting hole 11 so made in one end thereof as to have a diameter fitly mountable on the outer surface of the lead bushing 1, and the other end of the tab terminal member 10 having a bolt-insertion hole 12 is positioned to protrude horizontally outwards from a side face of the lead-acid battery A'. It is preferable that a material for the tab terminal member 10 is the same lead alloy as that for the lead bushing 1.

Further preferably, a cylindrical mold 7' made of copper is fitly mounted on and in contact with the peripheral surface of the projection 1*a* of the lead bushing 1 and a semicircular peripheral surface of an outer peripheral edge of the fitted end portion 10*a* of the tab terminal member 10, and in addition is placed on the upper surface of the lid portion b'1 in contact with the upper surface and opposite sides of the tab terminal member 10, with a rectangular notch portion 7'*b* formed at the lower end of the mold 7' being across the same, so that the mold 7'*b* also serves to cool the lead bushing 1 at the time of the laser-welding.

For the laser welding, a laser nozzle having a condenser lens therein is disposed at a height position which is about 100 mm spaced upwards apart from the upper surface of the lead bushing 1, while the shield glass 5 is disposed below the laser nozzle 4, in the same manner as in the previous embodiment.

FIGS. 4 and 5 show such a state that the mutually abutted annular portions 8 of the pole 2 and the lead bushing 1 around the outer periphery of the pole 2 have been already welded together to each other by the same laser welding as in the previous embodiment, so that a welded portion 8a has been well formed.

Further, according to the present invention, in order to weld the lead bushing 1 and the tab terminal member 10 therearound to each other, the laser welding of both of them is carried out by applying a laser beam 5a from the laser nozzle 5 to mutually abutting annular portions 13 of the lead bushing 1 and the tab terminal member 10 through the glass shield 5. In this case, as for a method of laser-welding, either a continuous welding type one or a pulsed welding type one may be adapted and the laser beam thereof is applied or irradiated, in the same manner as explained in the previous embodiment. Preferably, by the pulsed welding, a laser beam of a low output as low as 0.8~1.5 Joules/pulse is first applied to the surface of the lead terminal member 10 to expose lead inside the lead terminal member 10 to the outer surface thereof, and then, a laser beam of a high output as high as 6~8 Joules/pulse and in a rang of 6 points ~12 points of the lap number of beads/mm is applied, thereby the laser welding of the projection 1a of the lead bushing 1 and the lead tab terminal member 10 therearound to each other is carried out, so that production of a lead-acid battery is completed.

The heat generated from the start of the laser welding to the end thereof is remarkably small, as compared with that generated by a burner, so that there is occurred no thermal deformation of the lid. It is the same as in the previous embodiment that the cooling by the mold made of copper suffices, and that the conventional water-cooling is not required.

Furthermore, when the laser welding of the tab terminal member 10 is carried out, it is optional that after either a previous soldering is applied to the portions to be welded, or a ring-shaped solder is placed thereon, and thereafter the laser welding is carried out.

Thus, according to the present invention, when the welding of the lead bushing cast in the lid of the assembled lead-acid battery and the pole inserted through the lead bushing and further the welding of the lead bushing and the terminal member fitted on the lead bushing are carried out by the laser welding, even if the height of the lead bushing from the upper surface of the lid is remarkably lower than the case of the conventional art, a good welding can be achieved without exertion of an adverse affection onto the lid, and a stable and good lead-acid battery can be produced. Particularly, the lead-acid battery of the type having the terminal led out sideways can be produced smoothly, which is advantageous.

In this case, as mentioned above, if the laser beam of a low output of such a degree that produces no sputtering is first applied and is moved one round and thereafter a laser beam of a high output is applied and moved one round to and along the applied locus or trace of the laser beam of the low output, the laser welding of a predetermined depth can be achieved over the whole circumference without adhering sputtered leads to the shield glass. Particularly, when the pulsed type one as a laser welding method is carried out, the depth of weld can be more increased to provide a firm weld.

When the bushing 1 and the pole made of any of various kinds of lead alloys are welded to each other by applying the above-mentioned laser beam of the low output or/and the high output to the mutually abutted annular portions 8 or their vicinities and making it at least one round therealong, there is a fear that fumes generated during the welding are adhered to the shield glass 5 to intercept the passing of the laser beam therethrough and, as a result, the welding energy is lowered, and there can not be obtained a predetermined uniform or equal depth of penetration over the whole circumference, and in some cases, there can not be obtained a lead-acid battery provided with a terminal portion welded stably and satisfactorily.

An embodiment of the present invention removing such a fear will be described in detail with reference to FIGS. 6 to 10.

In FIGS. 6 to 10, reference character B designates one example of a laser-welding jig according to the present invention for use in carrying out the above-mentioned laser-welding process used in the process for producing a lead-acid battery according to the present invention. A cylindrical body 70a of a cylindrical shield 70 constituting a main body of the jig B is formed into a circular one made of a metallic material having a good thermal conductivity, for instance, a metal which is high in thermal conductivity such as copper and a copper alloy, and corresponds to the mold 7 also serving as the cooling action in the previous embodiment. The cylindrical shield 70 is so constructed that an opening in the upper surface of the cylindrical body 70a is closed by a light-transmission plate 5 permeable to a laser beam, in general, by a heat-resistant glass plate 5, and the lower end portion thereof is formed into a cylindrical lower end portion 70a1 having the inner diameter suitable being fitly mounted on the outer peripheral surface of a terminal portion of a lead-acid battery. Further, the plural number, preferably, three or more of discharge openings 14,14, . . . are disposed at regular intervals and circumferentially so as to made open at the lower portion of the cylindrical body 70a, as shown in Figures, and furthermore, a shroud ring 16 which is provided with the plural number, for example, six of communication openings 15,15, . . . in the illustrated embodiment, positioned above the discharge openings 14,14, . . . and disposed at regular intervals and circumferentially, is installed in the cylindrical shield 70 so that an annular space 17 may be left between the shroud ring 16 and the inner surface of a peripheral wall of the cylindrical shield 70, and an exhaust port 18, preferably, a tubular exhaust port 18 as shown in the Figures is provided in a protruding fashion in the cylindrical shield 70 to communicate with the annular space 17.

More specifically, the illustrated cylindrical shield 70 is formed with a relatively thick cylindrical wall 70a3 of 5~10 mm in thickness, and the lower portion thereof is so formed into a tapered cylindrical wall 70a2 that its diameter is reduced gradually toward a cylindrical lower end portion 70a1, and the foregoing three discharge openings 14,14,14 are made in the tapered cylindrical wall 70a2 so that they may be inclined downwards from an outer end to an inner end of each thereof and open in the vicinity of an opening in the cylindrical lower end portion 70a1, and, in use, oxygen or air may be discharged at a desired discharge pressure from an external compression pump (not shown), through a pressure hose 19 air-tightly connected by a collet-chuck means to the each discharge opening 14, into the cylindrical shield 70 toward the open surface of the cylindrical lower end portion 70a1. The inner peripheral wall surface of the upper cylindrical wall 70a3 of the cylindrical shield 70 is formed into a notched wall surface of an L-shape in section for installing the shroud ring 16 of a U-shape in cross section, and the shroud ring 16 is installed in a recess portion in an inner periphery of the notched wall surface so that an annular space 17 may be formed between the recessed groove of the U-shape of the shroud ring 16 and the notched wall surface surrounding the outer periphery of the shroud ring. Further, a wide annular shield cap 20 of a T-shape in cross section is threadedly mounted on and is interposed between a top surface of the upper cylindrical wall 70a3 of the cylindrical shield 70 and a top surface of the shroud ring 16 located inside and at the same level as the top surface of the upper cylindrical wall 70a, so that the shroud ring 16 is retained and fixed by pressing the upper and lower portions thereof by the cylindrical shield 70 and the annular shield cap 20. An opening in the upper surface of the annular shield cap 20 is closed by a disk-shaped glass plate 5', and it is jointed air-tight by sandwiching the peripheral edge thereof between the shroud ring 16 and the annular shield cap 20 through an annular packing 21 interposed there between, and thus the welding jig B is constructed.

Further, at the time of using thereof a connecting tube 22 such as a pressure tube is connected at one end thereof in a band-manner to the tubular exhaust port 18 and at the other end thereof to an external vacuum pump, so that fumes generated within the jig B during the welding may be sucked and exhausted at a desired negative pressure.

Figure 7:
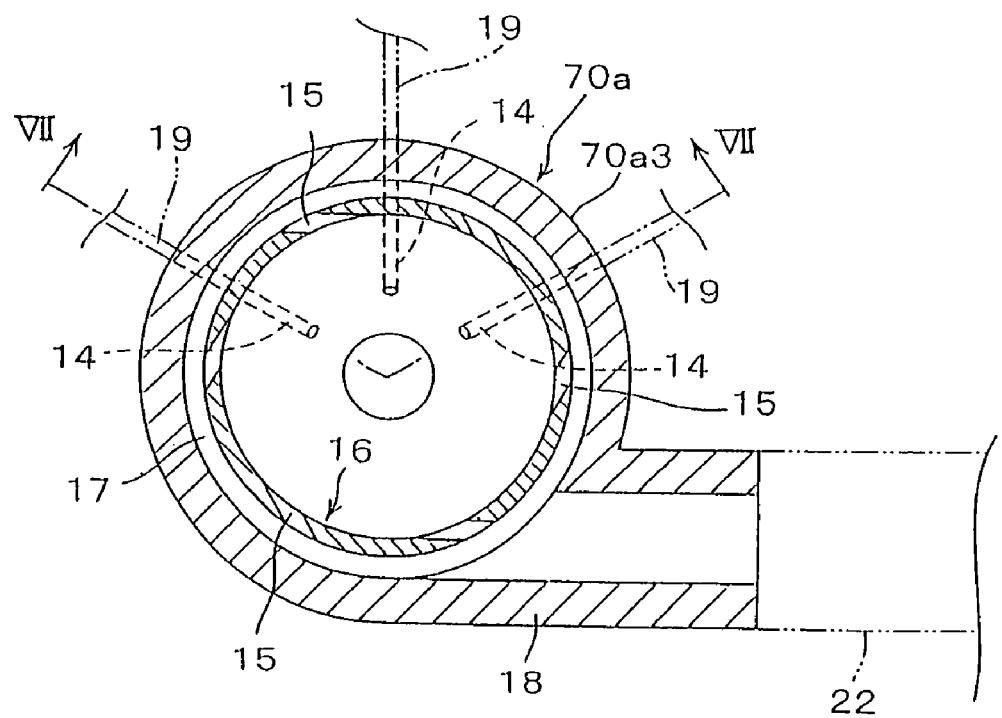
FIG. 7 is a sectional view taken along a line VI—VI in FIG. 6.
Figure 8:
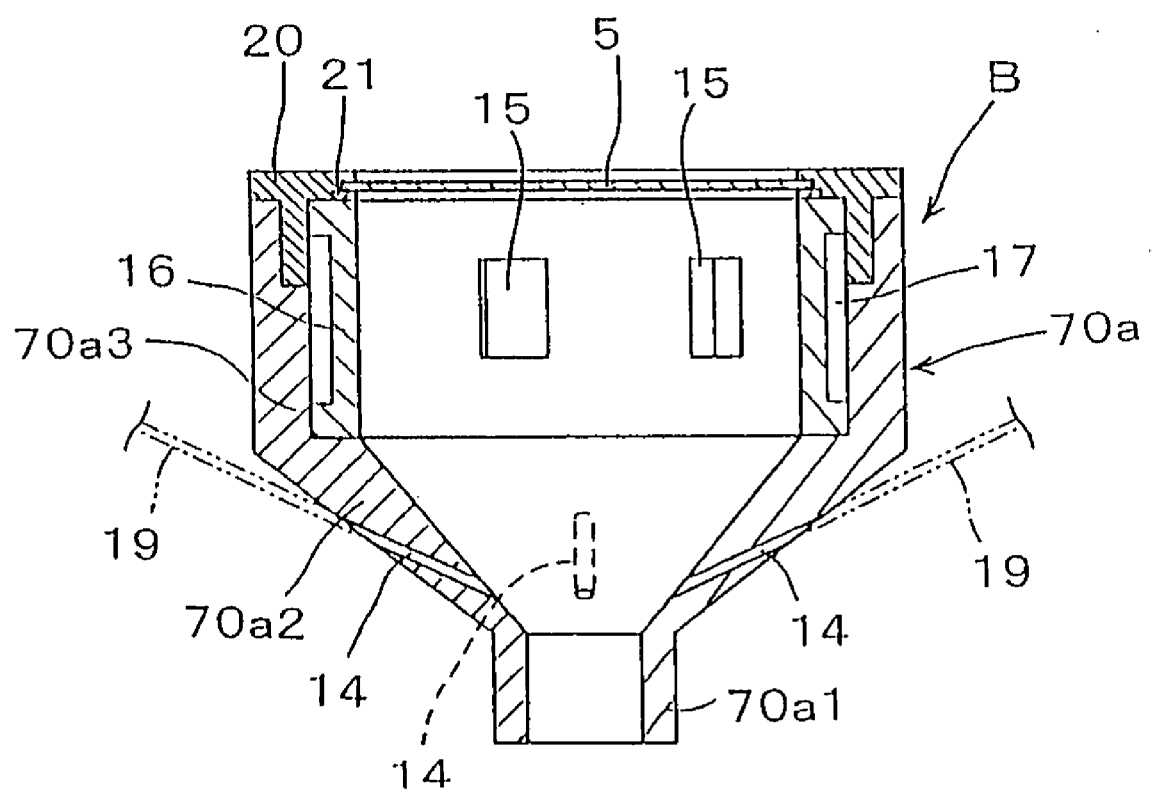
FIG. 8 is a sectional view taken along a line VII—VII in FIG. 7.

It is preferable that the six communication openings 15 disposed at equal intervals in the peripheral wall of the shroud ring 16 are opened in parallel and in a circumferentially tangent direction, as is clearly shown in FIG. 7, so that an eddy flow is caused to occur in the fumes generated within the jig B during the laser welding, whereby the fumes are sucked and exhausted smoothly and quickly without stagnating within the cylindrical shield 70, as described hereinafter.

Next, one example of a process for producing a lead-acid battery having a terminal welded by the above-mentioned laser-welding process according to the present invention by using the above-mentioned jig B according to the present invention will be described with reference to FIGS. 9 and 10.

The lower cylindrical end portion 70a1 of the cylindrical shield 70 of the jig B according to the present invention is fitly mounted on the outer peripheral surface of a terminal portions T comprising an upper end portion 1a of a lead bushing 1 cast in a container lid b", made of a synthetic resin in a lead-acid battery A", and an upper end portion 2a of a positive or negative pole, e.g., of a positive pole 2 in the illustrated embodiment inserted through an insertion hole 3 of the lead bushing 1, and in other words, on an outer peripheral surface of the upper end 1a of the lead bushing 1, and therefore the inside of the cylindrical shield 70 is made airtight. On the other hand, the discharge openings 14,14,14 disposed in the lower portion of the cylindrical shield 70 are connected to an external common compression pump (not shown) through the connecting tubes 19,19,19 such as a pressure tube, and the tubular exhaust port 18 protruding from the side surface of the upper portion of the cylindrical shield 70 is connected to the external vacuum pump {not shown) through the connecting tube 21 such as a pressure tube.

A laser nozzle 4 led out, for example, from a pulsed type laser generator {not shown) is so positioned above the jig B placed on the battery lid b', surrounding the terminals T, as described above, so that a leaser beam 4b may be directed as shown by an arrow, through an incident lens within the laser nozzle 4 toward a target of the portions to be welded, i.e., toward one point of mutually abutted circular portions 8 constituting the terminal portions T composed of a projection 1a of a lead bushing 1 and an upper portion of either a negative or a positive pole 2, that 2a of the positive pole 2 in the illustrated example, inserted through the insertion bore in the lead bushing 1'. At this time, the distance between the portions 8 to be welded and the laser nozzle 4 is set to be equal to a focal distance of the incident lens within the laser nozzle 4. In the case of application of the laser beam, the laser nozzle 4 is moved round at a radius equal to the radius of the circular portions 8 to be welded, thereby applying the laser beam at least one round to the entire circumference of the portions 8 to be welded, thus welding the portions 8 together. In this case, the application conditions of the laser beam are, for example, such that a quantity of application heat is in a range of 5~10 Joules/pulse and that the application intervals are in a range into the cylindrical shield 70 is sucked to be exhausted together with the generated fumes as an exhaust gas. The heat of the bushing 1 rising in temperature during the welding is removed simultaneously with the exhaustion of the gas, so that the temperature of the bushing 1 can be correspondingly lowered to satisfactorily prevent the softening and fusion of the resin around the bushing 1.

When the welding of the portions 8 to be welded is carried out by the application of the laser beam, oxygen or air is discharged under a desired pressure into the cylindrical shield 70 through the discharge openings 14,14, . . . by the compression pump. In this case, the oxygen or air is discharged toward the open surface of the lower cylindrical end portion 70a1, i.e., toward the terminal portions T. In general, it is economically preferable that the air is used. The reflection of the laser beam can be inhibited by oxidizing the surfaces of the portions 8 to be welded by the oxygen or air during the welding, whereby the welding by the irradiation of the laser beam can be carried out at a good efficiency.

On the other hand, a decompression device such as a vacuum pump, etc. is driven to perform an evacuation at a desired negative pressure through the tubular exhaust port 18, whereby fumes generated within the cylindrical shield 70 during welding of the portions to be welded is sucked and exhausted immediately from the cylindrical shield 70 to the outside, so that the fumes are prevented from adhering to the shield glass 5 and intercepting the passing of the laser beam therethrough. Accordingly, a good laser welding of a depth of penetration uniformly welded over the whole circumference of the portions 8 without any reduction in a predetermined laser output. The shielding fluid flowed into the cylindrical shield 70 is sucked to be exhausted together with the generated fumes as an exhaust gas. The heat of the bushing 1 rising in temperature during the welding is removed simultaneously with the exhaustion of the gas, so that the temperature of the bushing 1 can be correspondingly lowered to satisfactorily prevent the softening and fusion of the resin around the bushing 1.

In this case, when the communication openings 15,15, . . . are made in the circumferentially tangent direction in the shroud ring 16 as mentioned above, an eddy flow is caused to occur in the flow of the exhaust gas, and the exhaust gas can be sucked to be exhausted smoothly and quickly as a flow in a given definite direction. Thus, the discharge amount of the shielding fluid to be flowed into the cylindrical shield 70 through the discharge opening 14 and the exhaust amount of the shielding fluid to be sucked and exhausted is adjusted as desired to any of various values and a desired preferable laser welding can be carried out. For this purpose, the discharge pressure and discharge flow rate of the shielding fluid by the compression pump and the exhaust pressure and exhaust rate of the exhaust fluid by the vacuum pump are adjusted to any of various values, and particularly, it is preferable to set the discharge pressure in a range of 60~80 Kpa, the discharge flow rate in a range of 15~20 liters/min, the exhaust pressure in a range of 300~450 Pa and the exhaust flow rate in a range of 4~5 m³/min.

If the discharge pressure and flow rate of the shielding fluid are larger than the above-mentioned values, the fused lead is liable to be scattered. In reverse, if the discharge pressure and flow rate thereof are smaller than the above-mentioned values, the fusion or melting of the lead becomes insufficient, and the depth of weld or penetration is liable to be insufficient. Further, if the exhaust pressure and flow rate of the exhaust fluid are made larger than the above-mentioned values, the air in the battery is sucked up through such a part of the terminal portion 8 that is not welded yet to cause a failure of the weld. In reverse, if are made smaller than the values, the light-transmission plate 5 is polluted due to the scattering of the fumes, so that the welding power exerted on the portions 8 by the laser beam is reduced, so that there is brought about a tendency to cause the weld failure.

On the other hand, since the cylindrical shield 70 is made of a thermally conductive material, as mentioned above the heat generated during the laser welding can be immediately taken away and dissipated to the open air, so that the softening and melting of the resin around the lead bushing 1 can be prevented.

Figure 10:
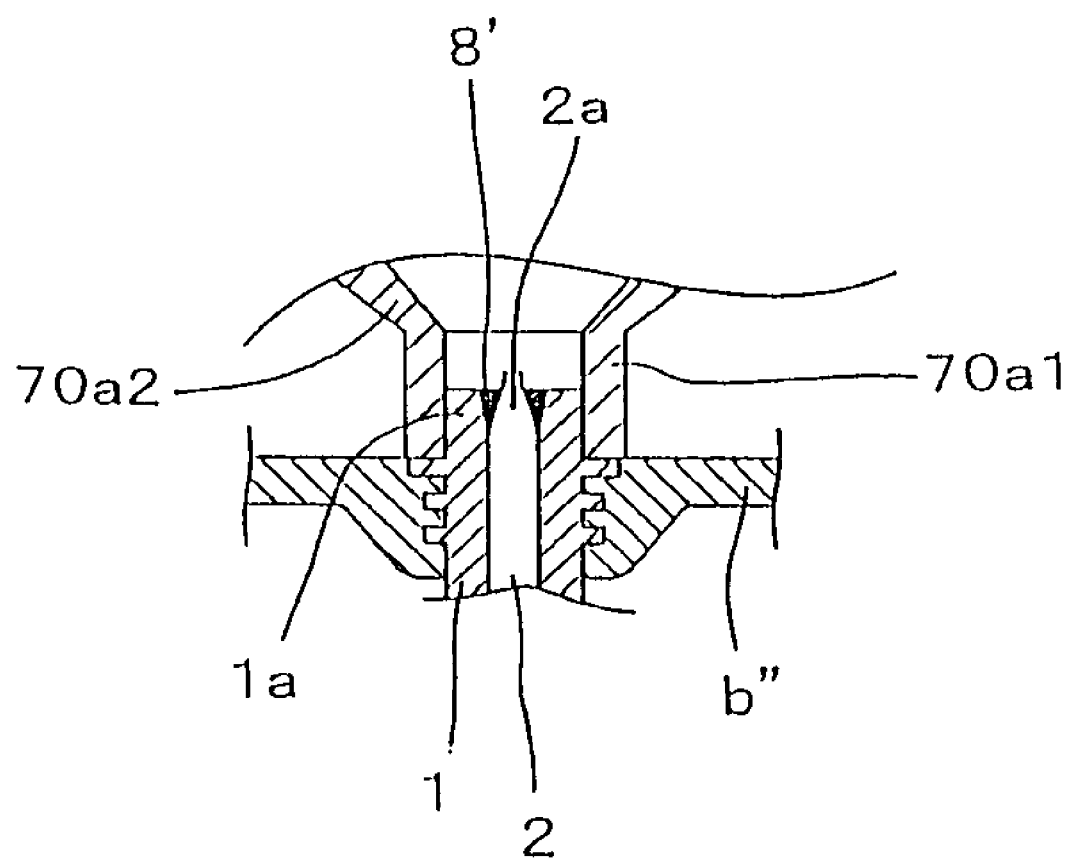
FIG. 10 is a sectional view of a portion of FIG. 9 showing one example of a laser-welded state of terminal portions of a lead-acid battery.

FIG. 10 shows a welded state 8' of the portions 8 to be welded at the completion of the laser welding. Since the peripheral surface of the circumferentially uniformly welded terminal portion welded at the depth of about 4~6 mm uniformly over the entire circumference thereof is protected by that the lower cylindrical end portion 70a1 of the cylindrical shield 70 having the good thermal conductivity is fitly mounted thereon the laser-welded terminal portion T which is good in appearance can be obtained.

Figure 9:
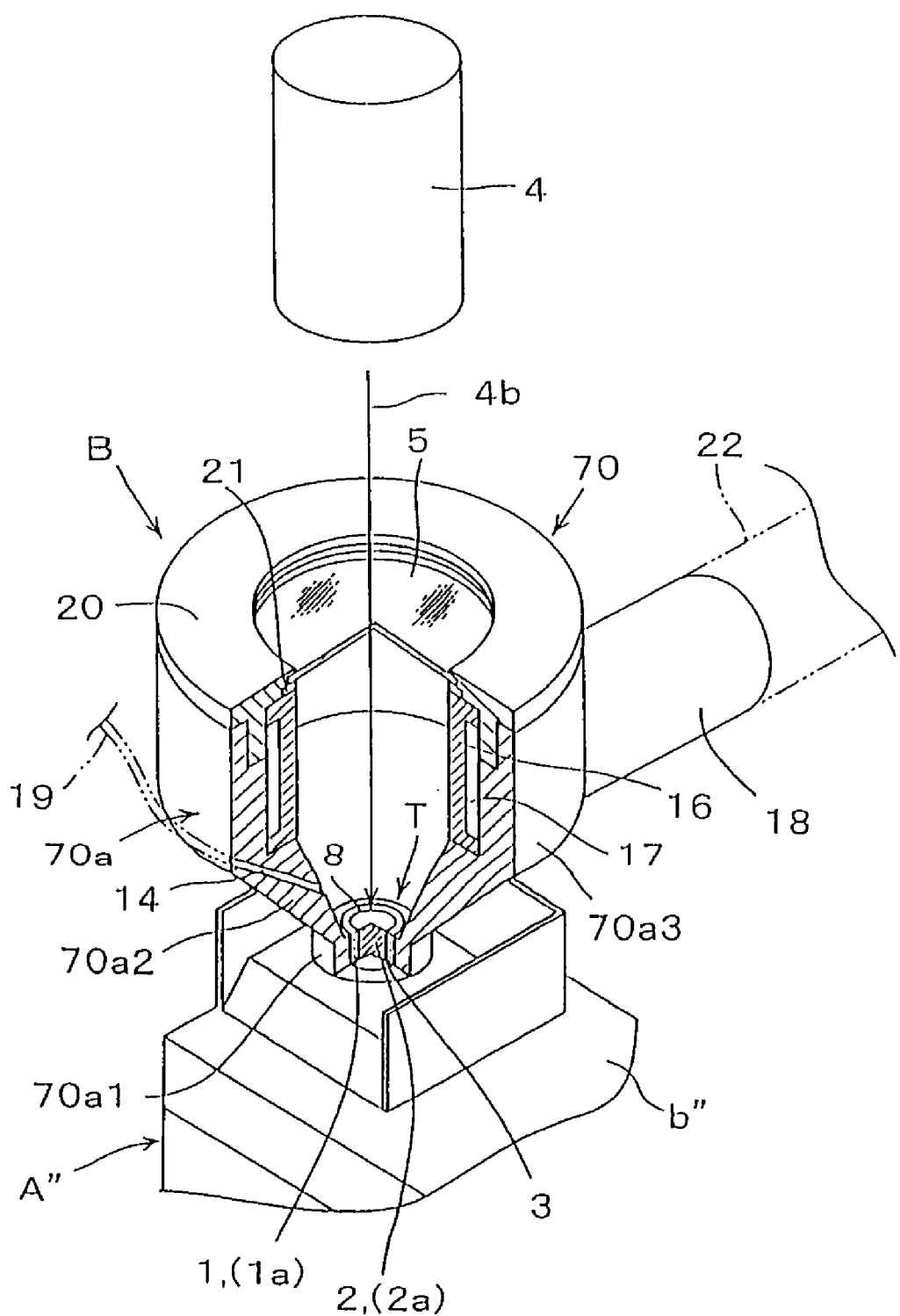
FIG. 9 is a partially cutaway perspective view for explaining one example of a process for laser welding used in the present invention.
Figure 11:
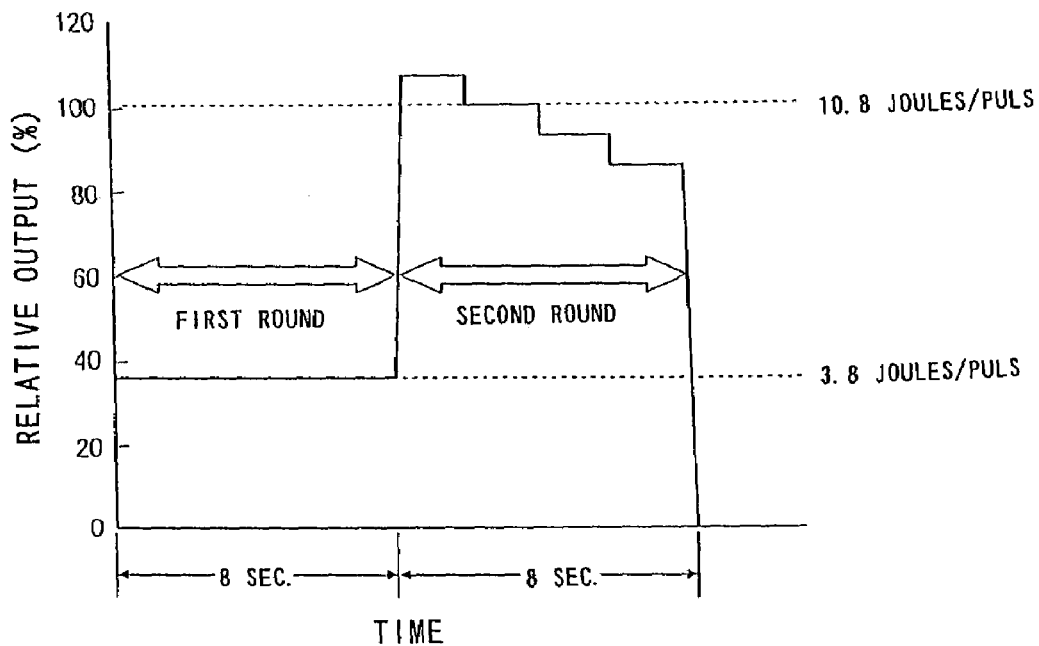
FIG. 11 is a graph for explaining a most preferable embodiment of a laser-welding process for use in the process for producing the lead-acid battery according to the present invention.
Figure 12:
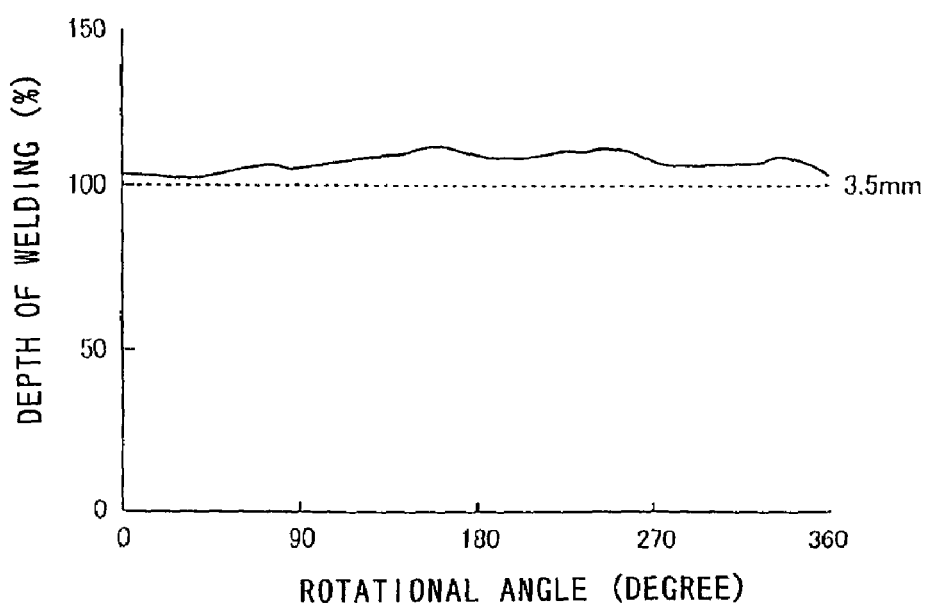
FIG. 12 is graph for explaining a depth of uniform weld over the entire circumference of the welded terminal portions in the most preferable embodiment.

Furthermore, in the embodiment shown in FIG. 9 above, the welding of the annular portions 8 to be welded was carried out for 100 pieces of the lead-acid battery provided with the terminal portions to be welded by applying a laser beam at a low output of 3.8 Joules/pulse while moving the first rotation (the first round) along the portions 8 to be welded to break the oxide film, and then applying a laser beam of a high output reduced stepwise at a plurality of stages, for example, of 11.5 Joules/pulse, 10.8 Joules/pulse, 10 Joules/pulse and 9.2 Joules/pulse while moving the second rotation (the second round), as shown in FIG. 11. It has been found that the first round and the second round result in that the depth of weld is substantially uniformly within a range 4~6 mm over the whole circumference of the annular portions to be welded, as shown in FIG. 12, and the resin of the lid b''' around the terminal portion T is not softened or molten at all, and accordingly, there can be obtained assuredly the lead-acid batteries with an air-tightness being well maintained without transuding of the electrolyte. Further, the number of the stages of the stepwise high outputs is not limited, but about 2~8 stages are preferable from the viewpoints of the quality, the producing equipment and the like.

Further, the example in which the discharge opening 14 is made in the cylindrical shield 70 and the oxygen or air is supplied therethrough has been shown as one example of the embodiment of the present invention. However, only if the fume is removed, it can be achieved only by suction through the exhaust port 18. In this case, a suitable gap is created so that compression in the cylindrical shield 70 may not be reduced. For example, it is arranged that gaps are created between the lower end portion of the cylindrical shield 70 and the surface of the lid or between the lower cylindrical end portion 70a1 and the outer peripheral surface of the terminal portions T, or that the provision of the annular packing 20 is omitted, so that the open air is flowed by the suction into the cylindrical shield 70 through a gap between the annular shield cap 19 and the glass plate 5. In this case, since the open air is flowed by the suction into the cylindrical shield 70 through these gaps, oxygen is supplied and the depth of weld can be deepened, which is preferable.

Thus, according to the present invention, since the laser welding of the terminal portions to be welded is carried out in such a manner that in such a state that the terminal portions of the lead-acid battery is surrounded by the lower cylindrical end portion of the cylindrical shield, the shield fluid is flowed thereinto through the discharge opening made in the cylindrical shield and is brought into contact with the terminal portions to be welded, and meanwhile, fumes generated during the laser welding is removed by suction through the exhaust port made in the cylindrical shield, and the reflection of the laser beam is inhibited by the shielding fluid and the laser welding can be carried out at a good efficiency, and also the intercepting of the laser beam by fumes for intercepting the laser beam can be prevented and the lowering of the sufficient laser output can be prevented and the welding efficiency is improved and also a uniform depth of weld at the welded portion can be assured.

In this case, owing to installing the shroud ring having the communication bores in the cylindrical shield, the shielding fluid flowed into the cylindrical shield can be retained for a while in the inside space of the shroud ring without directly undergoing the exhausting suction to ensure that it is brought into contact with the portions to be welded, and thereafter can be exhausted, while carrying the fumes, through the communication bores.

Further, by making the communication bores disposed in the shroud ring in the circumferentially tangent direction, the eddy flow is caused to occur in the fumes, so that it can be sucked and removed smoothly and satisfactorily.

Furthermore, by carrying out the laser welding using the laser-welding jig according to claim 14 of the present invention, the above-mentioned effects are brought about, and the softening and fusion of the resin around the bushing can be prevented, thereby a good lead-acid battery can be obtained easily and at a high efficiency.

Figure 13:
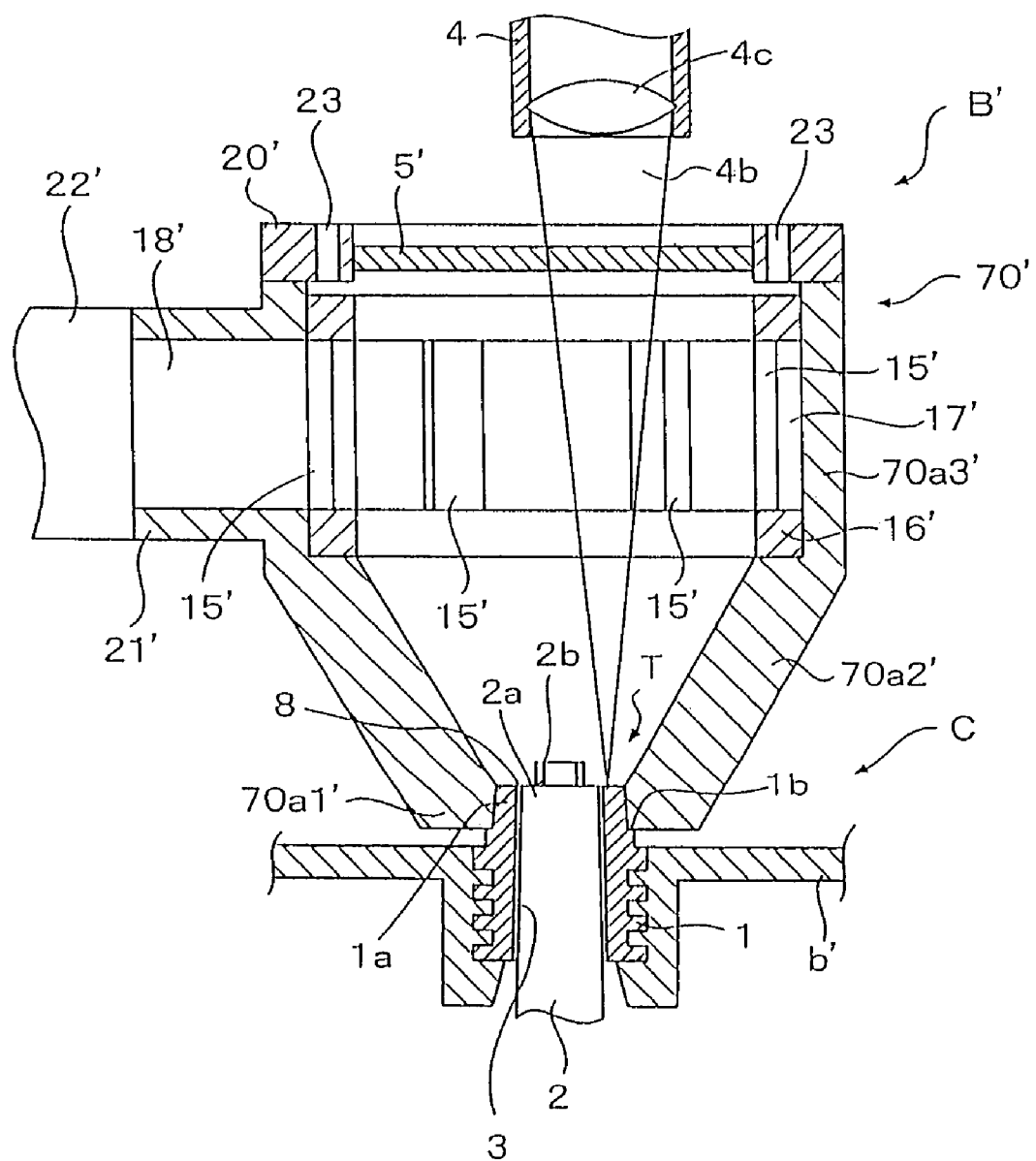
FIG. 13 is a centrally vertical sectional view of another embodiment of an apparatus used in a process for producing a lead-acid battery according to the present invention.

FIG. 13 shows a modification of an apparatus for carrying out the process for producing the lead-acid battery according to the present invention. A pole 2 is so formed that a projection 2b having such a height and a diameter that a laser beam does not strike against the projection 2a, specifically, a hollow columnar or hollow cylindrical projection, e.g., a cylindrical projection (in the illustrated embodiment), is integrally provided at the center of an upper end surface of the pole 2. As for the lead bushing 1 through which the pole 2 inserted and by which it is surrounded, an outer peripheral surface of the protrusion portion 1a thereof is formed with an annular notched step 1b. A laser-welding jig B' has such a construction that an annular shield cap 20' which surrounds and holds a light-transmission glass 5', and in which the plural number of, for instance, six of circular air-intake openings 23,23, . . . each having a diameter of about 5 mm are made at equal intervals circumferentially is secured to an upper surface of a cylindrical shield 70' made of a good thermal conductivity, and an exhaust tube 21' having an inside diameter of about 30 mm is provided on an upper cylindrical wall 70a3' of the cylindrical shield 70'. In use, the laser-welding jig B' is placed so that the lower cylindrical end 70a1' thereof may be fitly mounted on the outer peripheral surface of the protrusion 1a of the lead bushing 1 and also placed on a surface of the annular notched step 1b, as shown in FIG. 13. In FIG. 13, reference character 15' designates a communication opening disposed in the shroud ring 16'; reference character 17' designates an annular space; and reference character 22' designates a connecting tube connected to the exhaust tube 21'.

Thus, the laser welding is carried out in such a state that the lower cylindrical end 70a1" of the laser-welding jig B" is fitly mounted on the annular notched step 1b provided on the outer peripheral surface of a terminal T, in other words, on the outer peripheral surface of the protrusion 1a of the lead bushing 1 thereof, and, in the illustrated embodiment, a laser nozzle 4 is so positioned so that a laser beam 4b converged by a condenser lens 4c may be focused to hit on the outer side portion about 0.15 mm from the boundary of the annular abutted portions 8 (with a gap of 0~0.5 mm left therebetween) between the outer peripheral surface of the pole 2 and the inner peripheral surface of the lead bushing 1, and in other words, the laser beam 4b may hit on the inner peripheral edge of the lead bushing 1. And laser nozzle 4 is moved round along the inner peripheral edge of the lead bushing so that the laser beam 4b thereof may be applied thereto and, meanwhile, the evacuation by suction is conducted through the exhaust tube 21' and the connecting tube 22'. The laser welding is carried out in the above-mentioned manner that the leaser beam of such a low output that generates no sputtering, was made one round and thereafter the laser beam of a high output was made one round. Thus, the laser welding between the pole 2 and the lead bushing 1 can be welded to each other satisfactorily with a uniform depth over the entire circumference. In the case, when the laser beam of the high output is made one round, it is of course that it is made one round either at a uniform or definite high output or by reducing a high output stepwise at the plural number of stages. According to the present embodiment, the open air is sucked into the cylindrical shield 70' through the air-intake openings 23,23, . . . by the above-mentioned suction evacuation action and always exhausted to the outside through the cylindrical shield 70' while carrying the fume generated in the laser welding, so that the protection glass 5 can prevent the fumes from adhering thereto and accordingly, not only the portions X to be welded can be welded together satisfactorily with a predetermined high energy and with a predetermined good depth without intercepting the laser beam, but also there is accompanied by such an effect that the lead bushing 1 heated during welding is air-cooled by the sucked exhaust current.

On the other hand, since the lower cylindrical end portion 70a1' thereof is in close contact with the notched step 1b on the outer peripheral surface of the protrusion portion 1a of the lead bushing 1, the cylindrical shield 70' made of copper takes away the heat from the lead bushing 1 and dissipates the heat to the outside to cool the protrusion portion 1a of the lead bushing 1, so that rising in the temperature of the lead bushing can be prevented together with the above-mentioned air-cooling and also melting of the welded terminal is more assuredly prevented, and after completion of the laser welding process, there is obtained a good lead-acid battery in which transuding the electrolyte through the periphery of the welded terminal portion T is prevented assuredly.

Further, the cylindrical projection 2b on the upper end surface of the pole 2 serves as an index for judging the depth of weld in accordance with such a condition of the annular portion as molten by the heat at the time of the laser welding.

Furthermore, if the projection 2a is made a solid columnar projection, the columnar projection is clamped by an alligator clip at a charging step after completion of the laser welding, and even if a spark is generated between the projection and the alligator clip during charging, the projection serves to prevent the fracture of the terminal T due to the spark.

In addition, in a case where the focused point of the laser beam is so positioned as to hit on such an outer peripheral edge of the pole 2 that is inside the annular abutting portions, and the laser beam is applied along the inner peripheral edge, it is advantageous because the thermal influence exerted to the resin of the lid around the lead bushing 1 can be further reduced.

INDUSTRIAL APPLICABILITY

Thus, the present invention is applicable to the production of various lead-acid batteries such as a lead-acid battery for an electric automobile, a lead-acid battery for an automobile, an installed lead-acid battery and the like.

What is claimed is:

1. A process for producing a lead-acid battery comprising the step of welding together a lead bushing integrally cast in a lid of an assembled lead-acid battery and a pole inserted through the lead bushing by a laser welding,
wherein both the pole and the lead bushing are made of a lead-calcium based alloy, and at the time of the laser welding, a laser beam of a low output is applied first and thereafter a laser beam of a high output is applied.

2. A process for producing a lead-acid battery comprising the steps of:
welding together a lead bushing integrally cast in a lid of an assembled lead-acid battery and a pole inserted through the lead bushing by laser welding; and
welding the lead bushing and a tab terminal member fitly mounted on the lead bushing together by laser welding,
wherein both the pole and the lead bushing are made of a lead-calcium based alloy, and at the time of the laser welding, a laser beam of a low output is applied first and thereafter a laser beam of a high output is applied.

3. A process for producing a lead-acid battery according to claim 1 or 2, wherein the pole is provided with a columnar projection or a hollow cylindrical projection at the center of the upper end surface thereof.

4. A process for producing a lead-acid battery comprising the step of welding together a lead bushing integrally cast in a lid of an assembled lead-acid battery and a pole inserted through the lead bushing by a laser welding, wherein at the time of the laser welding, a laser beam of a low output is applied and thereafter a laser beam of a high output is applied.

5. A process for producing a lead-acid battery according to claim 4, wherein the first round of the application of the laser beam is made at the low output and the second round thereof is made at the high output reduced stepwise at the plural number of stages.

6. A process for producing a lead-acid battery according to claim 1 or 2, wherein the laser welding is of a pulsed type.

7. A process for producing a lead-acid battery comprising the step of welding together a lead bushing integrally cast in a lid of an assembled lead-acid battery and a pole inserted through the lead bushing by a laser welding,
wherein a lap density of beads in the laser welding of a pulsed type is in a range of 6 to 12 points per mm.

8. A process for producing a lead-acid battery comprising the step of welding together a lead bushing integrally cast in a lid of an assembled lead-acid battery and a pole inserted through the lead bushing by a laser welding,
wherein at the time of laser-welding by applying the laser to terminal portions to be welded of the lead-acid battery, the terminal portions are surrounded by a lower cylindrical end portion of a cylindrical shield, and, in this state, fumes generated at the time of the laser-welding are sucked to be exhausted to the outside of the cylindrical shield through the exhaust port in the cylindrical shield.

9. A process for producing a lead-acid battery according to claim 8, wherein there is used such a process for laser-welding of the terminal portions that a discharge opening is made in the cylindrical shield, and oxygen or air is supplied through the discharge opening to the portions to be welded.

10. A process for producing a lead-acid battery according to claim 8, wherein a shroud ring having the plural number of communication openings provided circumferentially in its peripheral wall is installed in the cylindrical shield with an annular space being left between the shroud ring and the inner peripheral wall surface of the cylindrical shield so that fumes generated in the shroud ring may be sucked to be exhausted out of the cylindrical shield through the communication openings of the shroud ring, the annular space surrounding thereof and the exhaust port, together with a shielding fluid flowed through the discharge opening into the cylindrical shield.

11. A process for producing a lead-acid battery according to claim 10, wherein the plural number of communication holes made at regular intervals in the shroud ring are formed into those which are open in a circumferentially tangent direction of the ring, whereby an eddy flow is occurred in the fumes generated inside the shroud ring and is sucked to be exhausted.

12. A process for producing a lead-acid battery according to claim 8, wherein an annular notched step is provided on a peripheral outer surface of the lead bushing defining an outer peripheral surface of the terminal portions, and the lower cylindrical end portion of the cylindrical shield having a good heat-conductivity is fitly mounted on the step thereof.

13. A process for producing a lead-acid battery comprising the steps of:
welding together a lead bushing integrally cast in a lid of an assembled lead-acid battery and a pole inserted through the lead bushing by laser welding; and
welding the lead bushing and a tab terminal member fitly mounted on the lead bushing together by laser welding,
wherein at the time of the laser welding, a laser beam of a low output is applied and thereafter a laser beam of a high output is applied.

14. A process for producing a lead-acid battery according to claim 13, wherein the first round of the application of the laser beam is made at the low output and the second round thereof is made at the high output reduced stepwise at the plural number of stages.

15. A process for producing a lead-acid battery comprising the steps of:
welding together a lead bushing integrally cast in a lid of an assembled lead-acid battery and a pole inserted through the lead bushing by laser welding; and
welding the lead bushing and a tab terminal member fitly mounted on the lead bushing together by laser welding,
wherein a lap density of beads in the laser welding of a pulsed type is in a range of 6 to 12 points per mm.

16. A process for producing a lead-acid battery comprising the steps of:
welding together a lead bushing integrally cast in a lid of an assembled lead-acid battery and a pole inserted through the lead bushing by laser welding; and
welding the lead bushing and a tab terminal member fitly mounted on the lead bushing together by laser welding,
wherein at the time of laser-welding by applying the laser to terminal portions to be welded of the lead-acid battery, the terminal portions are surrounded by a lower cylindrical end portion of a cylindrical shield, and, in this state, fumes generated at the time of the laser-welding are sucked to be exhausted to the outside of the cylindrical shield through the exhaust port in the cylindrical shield.

17. A process for producing a lead-acid battery according to claim 16, wherein there is used such a process for laser-welding of the terminal portions that a discharge opening is made in the cylindrical shield, and oxygen or air is supplied through the discharge opening to the portions to be welded.

18. A process for producing a lead-acid battery according to claim 16, wherein a shroud ring having the plural number of communication openings provided circumferentially in its peripheral wall is installed in the cylindrical shield with an annular space being left between the shroud ring and the inner peripheral wall surface of the cylindrical shield so that fumes generated in the shroud ring may be sucked to be exhausted out of the cylindrical shield through the communication openings of the shroud ring, the annular space surrounding thereof and the exhaust port, together with a shielding fluid flowed through the discharge opening into the cylindrical shield.

19. A process for producing a lead-acid battery according to claim 18, wherein the plural number of communication holes made at regular intervals in the shroud ring are formed into those which are open in a circumferentially tangent direction of the ring, whereby an eddy flow is occurred in the fumes generated inside the shroud ring and is sucked to be exhausted.

20. A process for producing a lead-acid battery according to claim 16, wherein an annular notched step is provided on a peripheral outer surface of the lead bushing defining an outer peripheral surface of the terminal portions, and the lower cylindrical end portion of the cylindrical shield having a good heat-conductivity is fitly mounted on the step thereof.

* * * * *

UNITED STATES PATENT AND TRADEMARK OFFICE
CERTIFICATE OF CORRECTION

PATENT NO. : 6,960,408 B1
DATED : November 1, 2005
INVENTOR(S) : Sakamoto et al.

It is certified that error appears in the above-identified patent and that said Letters Patent is hereby corrected as shown below:

<u>Title page,</u>
Item [12], change "Suzuki" to -- Sakamoto --.
Item [75], Inventors, change "Toshikazu Suzuki, Fukushima (JP)" to -- Hikaru Sakamoto, Fukushima (JP); Tomoki Hiruta, Fukushima (JP); Toshikazu Suzuki, Fukushima (JP); Takeyuki Matsumoto, Fukushima, (JP); Hiroyuki Iizuka, Fukushima (JP); Koichi Hoshino, Tochigi (JP) --.

Signed and Sealed this

Second Day of May, 2006

JON W. DUDAS
*Director of the United States Patent and Trademark Office*